United States Patent
Yang et al.

(10) Patent No.: US 10,969,898 B2
(45) Date of Patent: Apr. 6, 2021

(54) METHOD FOR DETERMINING A FORCE OF A TOUCH OBJECT ON A TOUCH DEVICE AND FOR DETERMINING ITS RELATED TOUCH EVENT

(71) Applicant: ELAN MICROELECTRONICS CORPORATION, Hsinchu (TW)

(72) Inventors: Hsueh-Wei Yang, Zhubei (TW); Ting-Jan Yang, Jincheng Township, Kinmen County (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/402,766

(22) Filed: May 3, 2019

(65) Prior Publication Data
US 2019/0361563 A1    Nov. 28, 2019

(30) Foreign Application Priority Data
May 22, 2018    (TW) ................................ 107117341

(51) Int. Cl.
  *G06F 3/0488* (2013.01)
  *G06F 3/041* (2006.01)
  *G06F 3/044* (2006.01)

(52) U.S. Cl.
  CPC .......... *G06F 3/0416* (2013.01); *G06F 3/0446* (2019.05); *G06F 3/0488* (2013.01); *G06F 2203/04104* (2013.01); *G06F 2203/04105* (2013.01); *G06F 2203/04808* (2013.01)

(58) Field of Classification Search
  CPC .. G06F 3/0416; G06F 3/04162; G06F 3/0446; G06F 3/0485; G06F 3/0488; G06F 2203/04104; G06F 2203/041045; G06F 2203/04808
  See application file for complete search history.

(56) References Cited

U.S. PATENT DOCUMENTS

| | | | |
|---|---|---|---|
| 10,037,112 B2 | 7/2018 | Shepelev et al. | |
| 10,055,036 B2 | 8/2018 | Koike et al. | |
| 2007/0139395 A1* | 6/2007 | Westerman | G06F 3/04815 345/173 |
| 2011/0291951 A1 | 12/2011 | Tong | |
| 2013/0307788 A1 | 11/2013 | Rao et al. | |
| 2017/0131840 A1 | 5/2017 | Deichmann et al. | |
| 2017/0357403 A1 | 12/2017 | Geary et al. | |
| 2018/0046307 A1* | 2/2018 | Wells | G06F 3/03547 |
| 2018/0260364 A1 | 9/2018 | Shim et al. | |

FOREIGN PATENT DOCUMENTS

| | | |
|---|---|---|
| CN | 102884496 A | 1/2013 |
| CN | 104182080 A | 12/2014 |
| CN | 104731451 A | 6/2015 |

\* cited by examiner

*Primary Examiner* — Robert J Michaud
(74) *Attorney, Agent, or Firm* — Patenttm.us (57) ABSTRACT

A method for determining a force of a touch object on a touch device and for determining its related touch event is provided. The touch object touched on the touch device is clustered into different object groups. Thus, multiple touch objects are simply grouped into two object groups to easily calculate the pressing force that is provided for determining follow-up touch event.

15 Claims, 7 Drawing Sheets

METHOD FOR DETERMINING A FORCE OF A TOUCH OBJECT ON A TOUCH DEVICE AND FOR DETERMINING ITS RELATED TOUCH EVENT

CROSS-REFERENCE TO RELATED APPLICATIONS

This application is based upon and claims priority under 35 U.S.C. 119 from Taiwan Patent Application No. 107117341 filed on May 22, 2018, which is hereby specifically incorporated herein by this reference thereto.

BACKGROUND OF THE INVENTION

1. Field of the Invention

The present invention is a method for determining a force of a touch object on a touch device, especially to a method for determining a force of a touch object pressing on a touch device.

2. Description of the Prior Arts

The touch device is an input interface currently widely used in mobile electronic devices. By detecting information such as the contact position, contact time, and movement rate of the touch object such as a hand or a pen on the touch device, the touch event to be triggered is determined, thereby corresponding to the instruction that the user desires to execute. In the beginning, the touch events are only simple single-finger events, such as clicks, drags, etc., and subsequent multi-finger gestures are gradually added as touch events, such as zooming in and out, scrolling, rotating, etc., to execute more complex instructions.

As the instructions are more complicated, in the prior art, when the multi-finger gesture is insufficient, the calculation of the force of the touch object is added in the prior art to execute more complex instructions. However, when the number of touch objects is large, the accuracy of the conventional method for calculating the force is low, which is not conducive to the subsequent judgment and application of the touch event.

To overcome the shortcomings, the present invention provides a method for determining a force of a touch object pressing on a touch device to mitigate or to obviate the aforementioned problems.

SUMMARY OF THE INVENTION

The main objective of the present invention is to provide a method for determining a force of a touch object pressing on a touch device.

To achieve the main objective, the present invention provides a method for determining a force of a touch object on a touch device comprising a touch input surface and multiple force sensors, wherein the method comprises steps of:
obtaining a touch information of each touch object on the touch input surface of the touch device and obtaining a force information of each force sensor corresponding to the touch objects;
assigning the touch objects to either a first object group or a second object group according to the touch information; and
calculating a pressing force of at least one of the first and second object groups based on the force information.

In another aspect, the present invention also provides a method for determining a force of a touch object on a touch device comprising a touch input surface and multiple force sensors, wherein the method comprises steps of:
(a) obtaining a touch information of each touch object on the touch input surface of the touch device and obtaining a force information of each force sensor corresponding to the touch objects;
(b) assigning the touch objects to either a first object group or a second object group according to the touch information;
(c) calculating a pressing force of at least one of the first and second object groups based on the force information; and
(d) determining a touch event according to the pressing force and the touch information of the at least one object group.

By clustering the touch objects to either the first object group or the second object group, the amounts of the pressing forces that need to be calculated is simplified to the two object group. Thus, the accuracy for the method of the present invention to calculate the pressing force is effectively enhanced.

Other objectives, advantages and novel features of the invention will become more apparent from the following detailed description when taken in conjunction with the accompanying drawings.

DETAILED DESCRIPTION OF THE EMBODIMENTS

Figure 2:
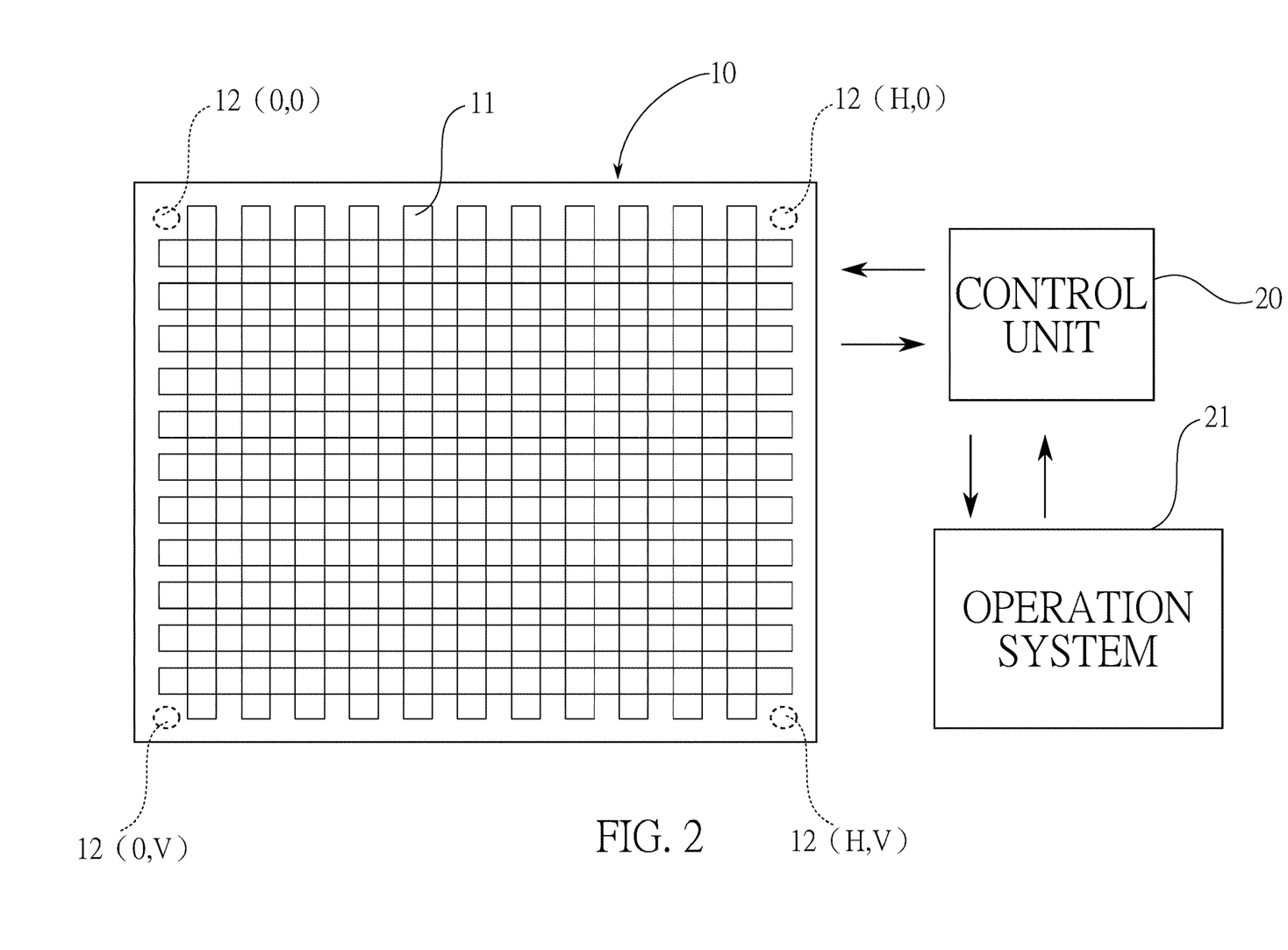
FIG. 2 is an illustrative view of a touch device.

With reference to FIG. 2, a touch device 10 comprises multiple touch sensors 11 and multiple force sensors 12. The touch sensors 11 are arranged under a touch input surface. In one embodiment, the touch sensors 11 are electrode units. When the touch object contacts or approaches the touch device 10, the electrode units generate a capacitance change, and a control unit 20 calculates the coordinates, area, contact time, movement rate and so on of the touch object based on the capacitance change. The force sensors 12 are mounted under a bottom side of the touch device 10. In one embodiment, the touch device 10 comprises four force sensors 12 respectively mounted under the four corners of the bottom side of the touch device 10, but is not limited to this arrangement.

Figure 1:
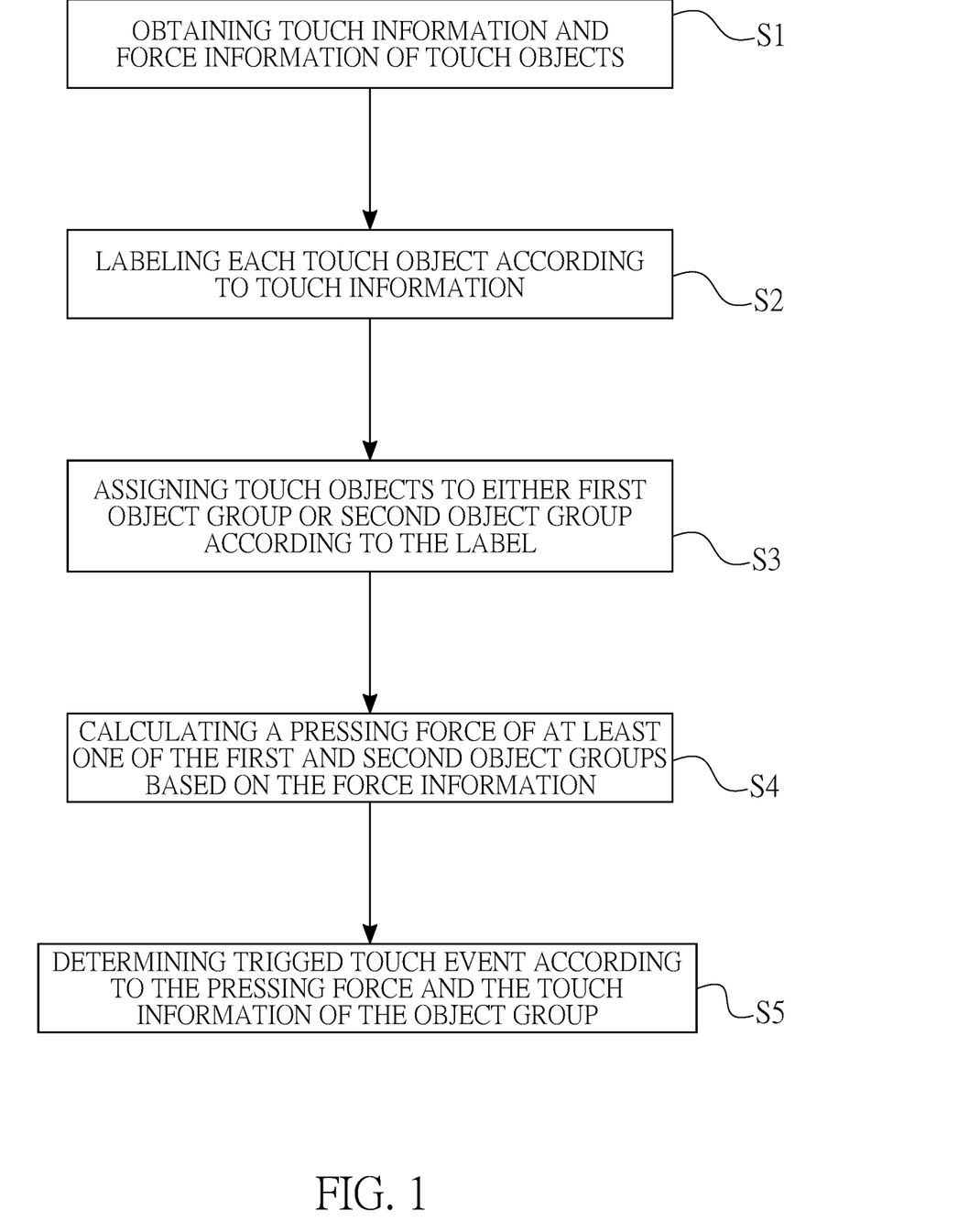
FIG. 1 is a flowchart of a method for determining a force of a touch object on a touch device in accordance with the present invention.

With reference to FIG. 1, a method for determining a force of a touch object on a touch device in accordance with the present invention comprises steps of obtaining a force information and a touch information of a touch object (S1), labeling each touch object according to the touch information (S2), assigning each touch object to either a first object group or a second object group based on the label of each touch object (S3), and determining a pressing force of at least one object group according to the force information (S4).

When multiple touch objects contact or approach the touch input surface of the touch device 10, the touch sensors 11 obtain the touch information of the touch objects and each force sensor obtains the force information sensed by its own position. The touch information includes the capacitance changes generated by the touch sensors 11, and the coordinates, areas, contact time, movement rates and so on of the touch objects on the touch device 10.

According to the obtained touch information, the touch objects are labeled. For example, each touch object may be labeled as a palm or a finger, each touch object may be labeled as a finger or a pen, or each touch object may be labeled as an active object or a non-active object.

The method to labeling the touch object may be one or multiple of the following methods, but is not limited to those methods. In one method, when the touch object contacts the touch sensors 11, a touch sensing group and a floating sensing group located outside the touch sensing group are generated. The touch objects are labeled as a finger or a palm according to whether the floating sensing group has a present feature. For example, when the floating sensing group has a smaller area or a narrower width, the touch object is labeled as a finger. When the floating sensing group has a lager area or a wider width, the touch object is labeled as a finger. In another method, when the touch object contacts the touch sensors 11, a maximum sensing value and a plurality of surrounding sensing values adjacent to the sensing position of the maximum sensing value are generated. A differentiation between the maximum sensing value and the surrounding sensing values is calculated. If the differentiation is greater than a preset value, the touch object is labeled as a pen. If the differentiation is less than the preset value, the touch object is labeled as a finger. For example, if the difference between the maximum sensing value and the surrounding sensing values is greater than a preset value, the touch object is labeled as a pen. If the difference between the maximum sensing value and the surrounding sensing values is less than the preset value, the touch object is labeled as a finger. Otherwise, if the ratio of the maximum sensing value to the surrounding sensing values is greater than a preset value, the touch object is labeled as a pen. If the ratio of the maximum sensing value to the surrounding sensing values is less than the preset value, the touch object is labeled as a finger. In still another method, when the touch object contacts the touch sensors 11, a maximum sensing value and a plurality of surrounding sensing values adjacent to the sensing position of the maximum sensing value are generated. A sum of the maximum sensing value and the surrounding sensing values is calculated. If the sum is greater than a preset value, the touch object is labeled as a finger. If the sum is less than the preset value, the touch object is labeled as a finger. In still another method, when the touch object contacts the touch sensors 11, the touch object is labeled as a non-active object first. When the touch object satisfies an actuating condition, the touch object is labeled as an active object. For example, when the moving distance of the touch object is greater than a threshold, the status of the touch object is changed from the non-active object to the active object. In still another method, when the touch object contacts the touch sensors 11, the touch object is labeled as an active object first. When the touch object is stagnant for more than a predetermined time, the status of the touch object is changed from the active object to the non-active object. In still another method, when the touch object is labeled as a finger, a palm, or a pen, which type of the touch object should be labeled as an active object or a non-active object is labeled according to the mode or application executed by the system at that time. For example, when the system executes an application for pen tablet, the pen is labeled as an active object while the palm and fingers are labeled as a non-active object. The aforementioned method to label the touch objects may be executed in the firmware of the intergrade circuit (IC), or may be executed in an associated driver installed in the operating system.

According to the label of each object, each touch object is assigned to the first object group or the second object group. In one embodiment, the first object group is an active object group, and the second object group is a non-active group. The active objects are considered as possible operational objects, and the non-active objects are considered as the objects that may cause a false touch. For example, when a touch object is labeled as a finger or a pen, the touch object is assigned to the first object group. When a touch object is labeled as a palm, the touch object is assigned to the second object group. In another aspect, when a touch object is labeled as an active object, the touch object is assigned to the first object group. When a touch object is labeled as a non-active object, the touch object is assigned to the second object group. In still another aspect, when a touch object is labeled as a finger or a pen and is labeled as an active object, the touch object is assigned to the first object group. When a touch object is labeled as other types or is labeled as other objects, the touch object is assigned to the second object group. In one embodiment, using a variety method to label the touch objects increases the chances of assigning the touch objects to the appropriate object group. For example, although a touch object is labeled as a finger so that the touch object may be assigned to the first group, the touch object is assigned eventually to the second group because the touch object is labeled as a non-active object based on other labeling method. For another example, although a touch object is labeled as an active object so that the touch object may be assigned to the first group, the touch object is assigned eventually to the second group because the touch object is labeled as a palm based on other labeling method.

In one embodiment, after each object is assigned to the first object group or the second object group in the step S3, a gravity center of each group is calculated before entering the step S4. In one embodiment, the gravity center of each object group is calculated according to the average of the positions of the touch objects in the object group. For example, the first object group includes two touch objects. One of the touch objects is located at coordinates (10, 20) and the other touch object is located at coordinates (15, 20). Then the gravity center is calculated as following formulas:

$X$ coordinate: $10 \times \frac{1}{2} + 15 \times \frac{1}{2} = 12.5$ $Y$ coordinate: $20 \times \frac{1}{2} + 20 \times \frac{1}{2} = 20$ Then the gravity center of the first object group is calculated at coordinates (12.5, 20) according to the positions of the touch objects.

In another embodiment, besides the positions of the touch objects, the areas of the touch objects are also considered as weights for calculating the gravity center. For example, the second object group includes two touch objects. One of the touch objects is located at coordinates (10, 20) with an area of 8 units (such as pixels, mm$^2$, etc.) and the other touch object is located at coordinates (15, 20) with an area of 2 units. Then the gravity center is calculated as following formulas:

$10 \times 8/10 + 15 \times 2/10 = 11$ X coordinate:

$10 \times 8/10 + 15 \times 2/10 = 11$

Y coordinate: $20 \times 8/10 + 20 \times 2/10 = 20$

Then the gravity center of the second object group is calculated at coordinates (11, 20) according to the positions of the touch objects.

When the touch objects are assigned to the object groups, each object group is regarded as a whole to calculate its pressing force based on the force information of the touch objects. That is, at most, it is only necessary to determine the pressing force of the two object groups (the first object group and the second object group) without individually calculating the pressing force of each touch object. In one embodiment, the pressing force of the first object group is labeled but the pressing force of the second object group is not necessary to be determined. In another embodiment, the gravity center calculated in the step S3 is used as a position of the pressing force. For example, it is assumed that the position of the gravity center of the first object group is located at $(x_1, y_1)$, the position of the gravity center of the second object group is located at $(x_2, y_2)$, and the positions of the four force sensors 12 respectively are (0, 0), (H, 0), (H, V), and (0, V). It is also assumed that the pressing force of the first object group is $F_1$, the pressing force of the second group is $F_2$, and the forces detected by the four force sensors respectively are $F_{TL}$, $F_{TR}$, $F_{BL}$ and $F_{BR}$. According to the two equations that the resultant force is zero and the resultant moment is zero, the value of $F_1$ and $F_2$ is solved. The pseudoinverse is listed accordingly as follows:

$$\begin{bmatrix} \left(1 - \frac{x_1}{H}\right)\left(1 - \frac{y_1}{V}\right) & \left(1 - \frac{x_2}{H}\right)\left(1 - \frac{y_2}{V}\right) \\ \left(\frac{x_1}{H}\right)\left(1 - \frac{y_1}{V}\right) & \left(\frac{x_2}{H}\right)\left(1 - \frac{y_2}{V}\right) \\ \left(1 - \frac{x_1}{H}\right)\left(\frac{y_1}{V}\right) & \left(1 - \frac{x_2}{H}\right)\left(\frac{y_2}{V}\right) \\ \left(\frac{x_1}{H}\right)\left(\frac{y_1}{V}\right) & \left(\frac{x_2}{H}\right)\left(\frac{y_2}{V}\right) \end{bmatrix} \begin{bmatrix} F_1 \\ F_2 \end{bmatrix} = \begin{bmatrix} F_{TL} \\ F_{TR} \\ F_{BL} \\ F_{BR} \end{bmatrix}$$

Determining a touch event according to the pressing force and the touch information of the at least one object group (S5): When the pressing force of the object group is determined, a touch event is determined according to the pressing force of the object group associated with the touch information of each touch object in the object group.

Therefore, the present invention provides the method to cluster the touch objects into the first object group and the second object group so that the pressing forces that need to be calculated are simplified to the pressing forces of the two object groups instead of the pressing forces of the multiple touch objects. In addition, the touch objects are further clustered into the active object group and the non-active object group. Then calculating the pressing force of either the active object group or the non-active object group is enough to determine the touch event sequentially. Thus, the method in accordance with the present invention simplifies the pressing forces that need to be calculated to the pressing forces of the two object groups instead of the pressing forces of the multiple touch objects, which does not influence the determination of the touch event.

The implementation of the method in accordance with the present invention is illustrated by the following embodiments, which are merely illustrative and not intended to limit the present invention.

Embodiment I

Figure 3A:
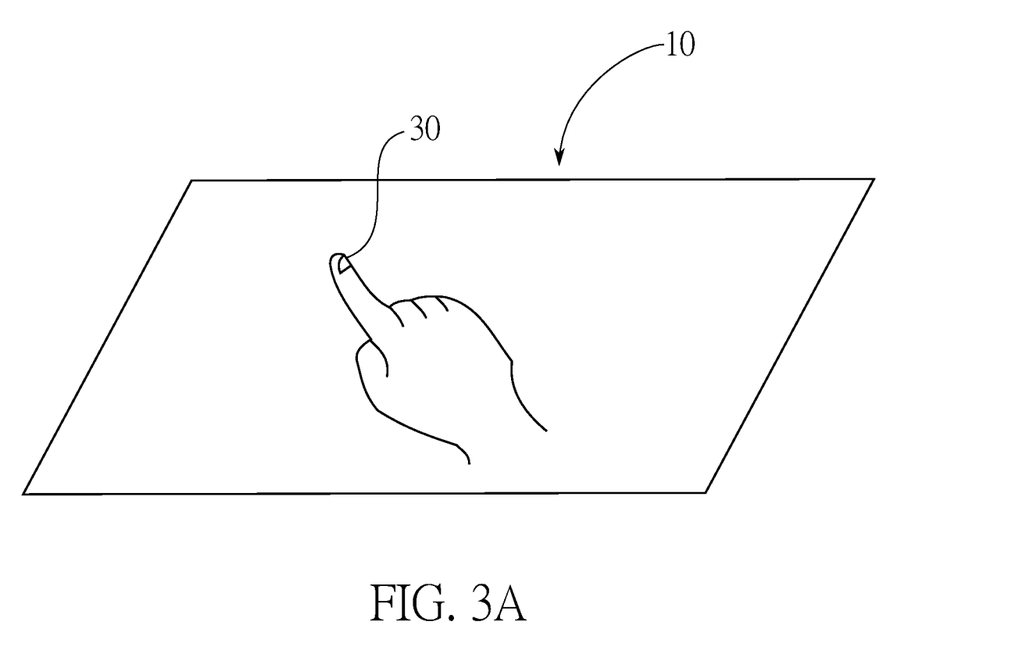
FIGS. 3A and 3B are first operational illustrative views of the method in FIG. 1.
Figure 3B:
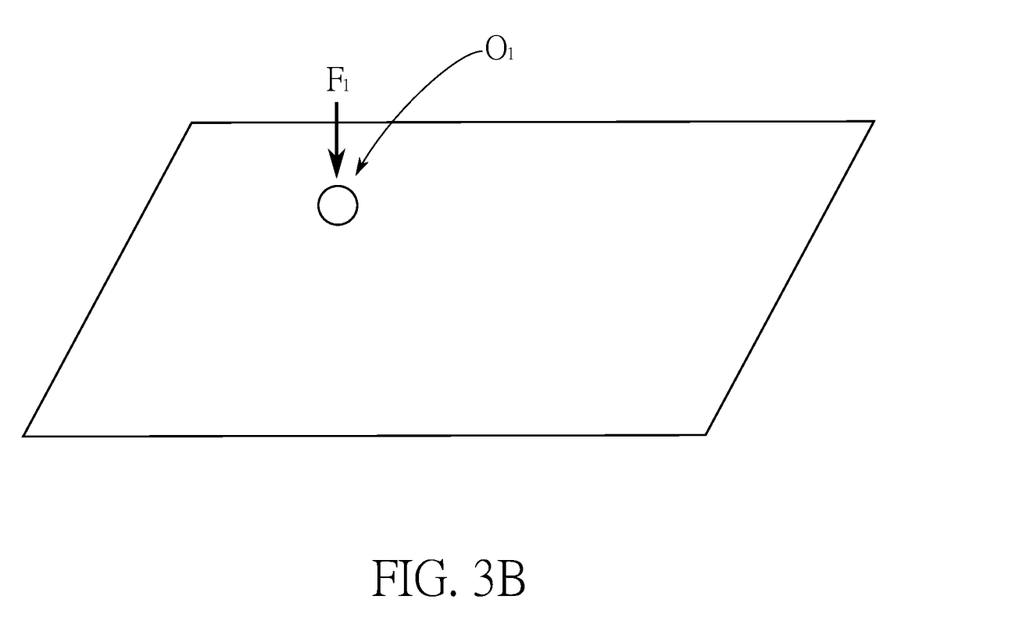

With reference to FIGS. 2, 3A and 3B, the user touches the touch device 10 with the right index finger 30. The touch sensors 11 obtain the touch information of the right index finger 30 including the position information and the contact time information. The force sensors 12 obtain different force information in their relative position due to the press of the right index finger 30. According to the touch information of the right index finger 30, it can be observed that the right index finger 30 clicks the touch device 10 and does not stagnate for more than a predetermined time. Thus, the touch of the right index finger 30 is labeled as a finger and an active object. Then the touch of the right index finger 30 is clustered into the first object group $O_1$ according to the label of the touch of the right index finger 30. Since the first object group $O_1$ only includes the touch of the right index finger 30, the position of the touch of the right index finger 30 is the gravity center of the first object group $O_1$. Then the pressing force $F_1$ of the first object group $O_1$ is calculated according to the force information of each force sensor 12. Based on the touch information of the right index finger 30 and the pressing force $F_1$ of the first object group $O_1$, the touch event is determined. For example, when the touch information shows that the right index finger 30 contacts a fixed point and the pressing force $F_1$ exceeds a threshold, the touch event is determined as "single click".

Embodiment II

Figure 4A:
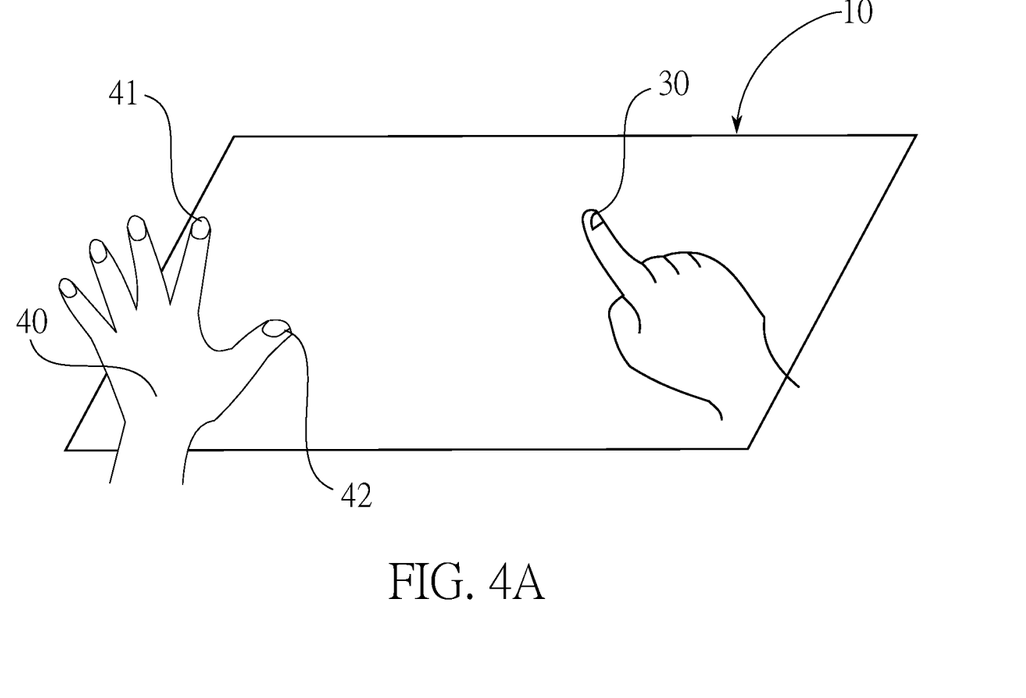
FIGS. 4A and 4B are second operational illustrative views of the method in FIG. 1.
Figure 4B:
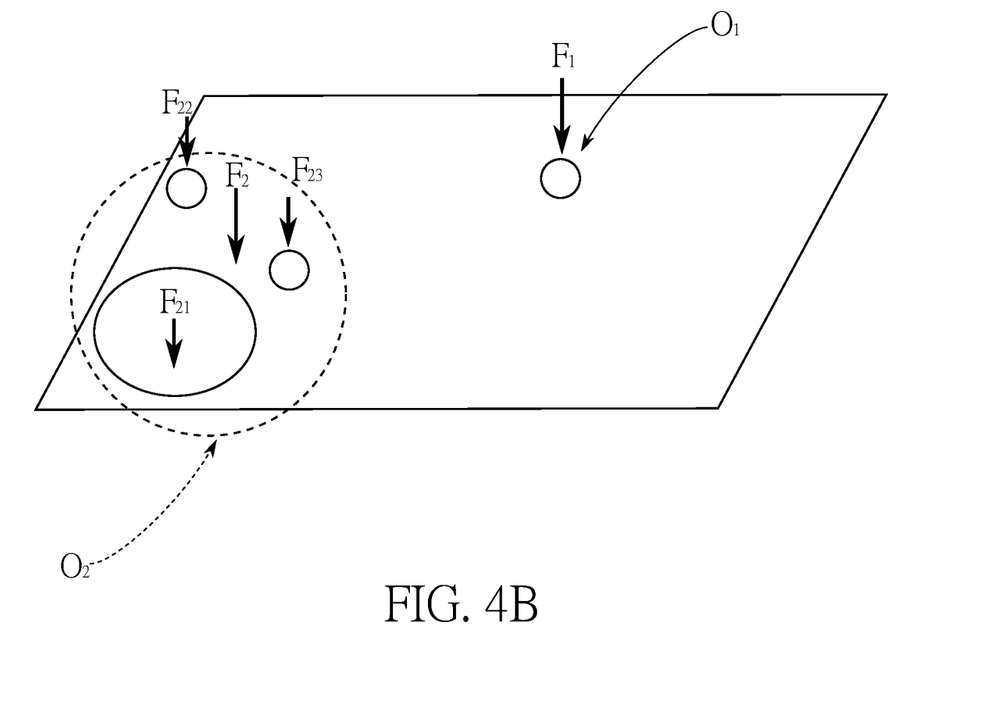

With reference to FIGS. 2, 4A and 4B, the user touches the touch device 10 with the right index finger 30 while the left palm 40, the left index finger 41 and the left thumb 42 are inadvertently placed on the touch device 10. The touch sensors 11 obtain the touch information of the right index finger 30, the left palm 40, the left index finger 41 and the left thumb 42 including the position information and the contact time information. The force sensors 12 obtain different force information in their relative position due to the presses of the right index finger 30, the left palm 40, the left index finger 41 and the left thumb 42. According to the touch information of the right index finger 30, it can be observed that the right index finger 30 clicks the touch device 10 and does not stagnate for more than a predetermined time. Thus, the touch of the right index finger 30 is labeled as a finger and an active object. According to the touch information of the left palm 40, it can be observed that the left palm 40 stagnates for more than a predetermined time. Thus, the touch of the left palm 40 is labeled as a palm and a non-active object. According to the touch information of the left index finger 41 and the left thumb 42, it can be observed that the left index finger 41 and the left thumb 42 stagnate for more than a predetermined time as well. Thus, the touches of the left index finger 41 and the left thumb 42 are labeled as fingers and non-active objects. Then the touch of the right index finger 30 is clustered into the first object group $O_1$ according to the label of the touch of the right index finger 30, while the touches of the left palm 40, the left index finger 41 and the left thumb 42 are clustered into the second object group $O_2$ according to the labels of the touch of the left index finger 41 and the left thumb 42. Since the first object group $O_1$ only includes the touch of the right index finger 30, the position of the touch of the right index finger 30 is the gravity center of the first object group $O_1$. The gravity center of the second object group $O_2$ is calculated by the positions of the touches of the left palm 40, the left index finger 41 and the left thumb 42 with calculating their average or weightingly calculating their average. Then the pressing force $F_1$ of the first object group $O_1$ and the pressing force $F_2$ of the second object group $O_2$ are calculated according to the force information of each force sensor 12, instead of calculating the pressing forces $F_{21}$, $F_{22}$, $F_{23}$ of the left palm 40, the left index finger 41 and the left thumb 42. Based on the touch information of the right index finger 30 and the pressing force $F_1$ of the first object group $O_1$, the touch event is determined. The touch information of the left palm 40, the left index finger 41 and the left thumb 42 and the pressing force $F_2$ of the second object group $O_2$ do not trigger any touch event. For example, when the touch information shows that the right index finger 30 contacts a fixed point and the pressing force $F_1$ exceeds a threshold, the touch event is determined as "single click". Since the pressing force $F_2$ belongs to the second object group $O_2$, it is ignored without triggering any touch event, thereby preventing the palm from erroneously triggering the single click.

Embodiment III

Figure 5A:
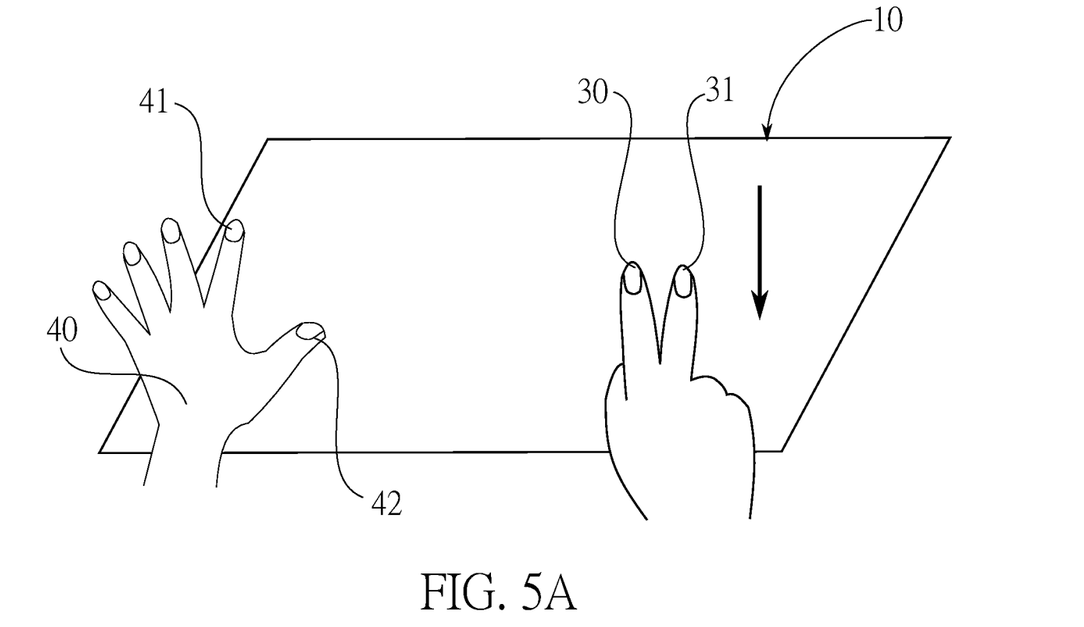
FIGS. 5A and 5B are third operational illustrative views of the method in FIG. 1.
Figure 5B:
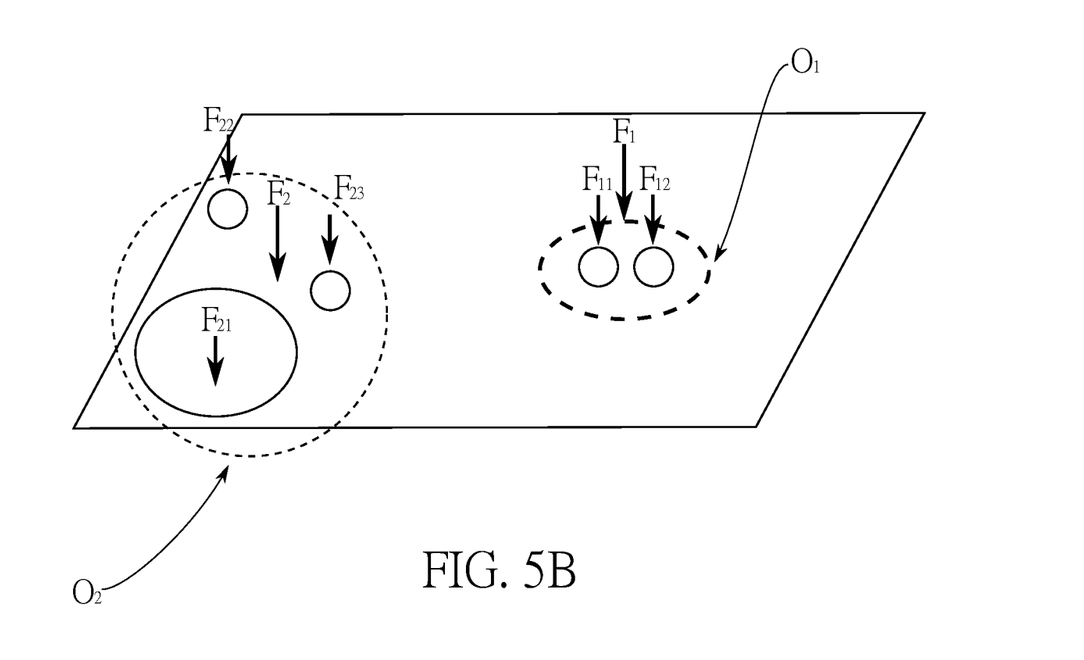
Figure 6A:
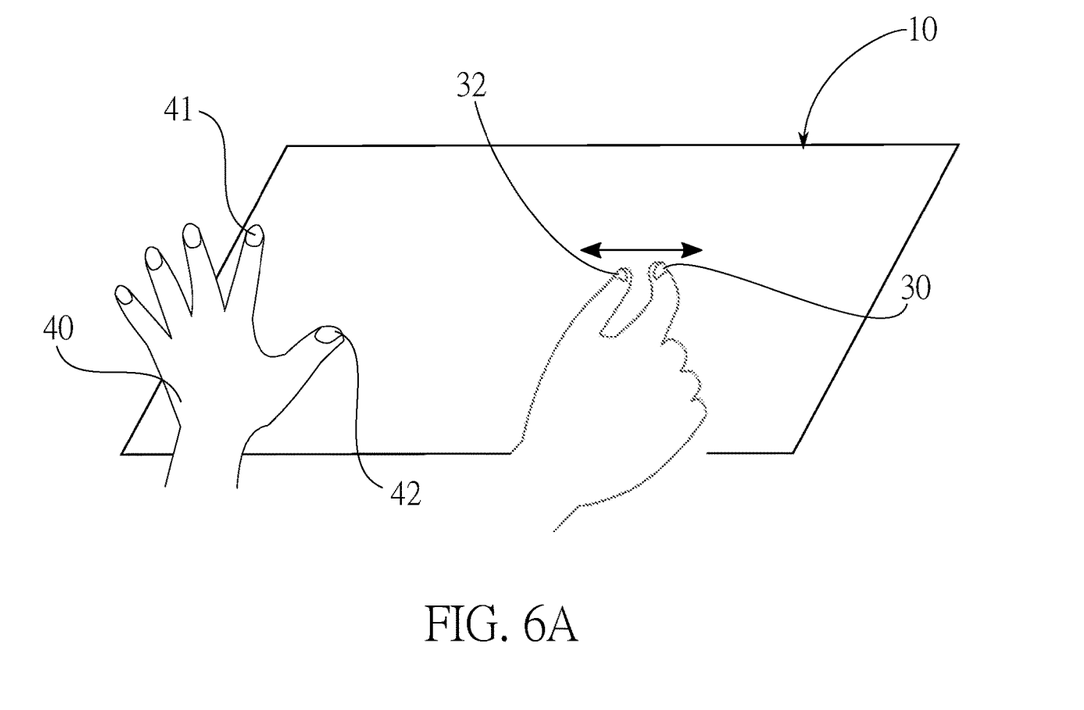
FIGS. 6A and 6B are fourth operational illustrative views of the method in FIG. 1.
Figure 6B:
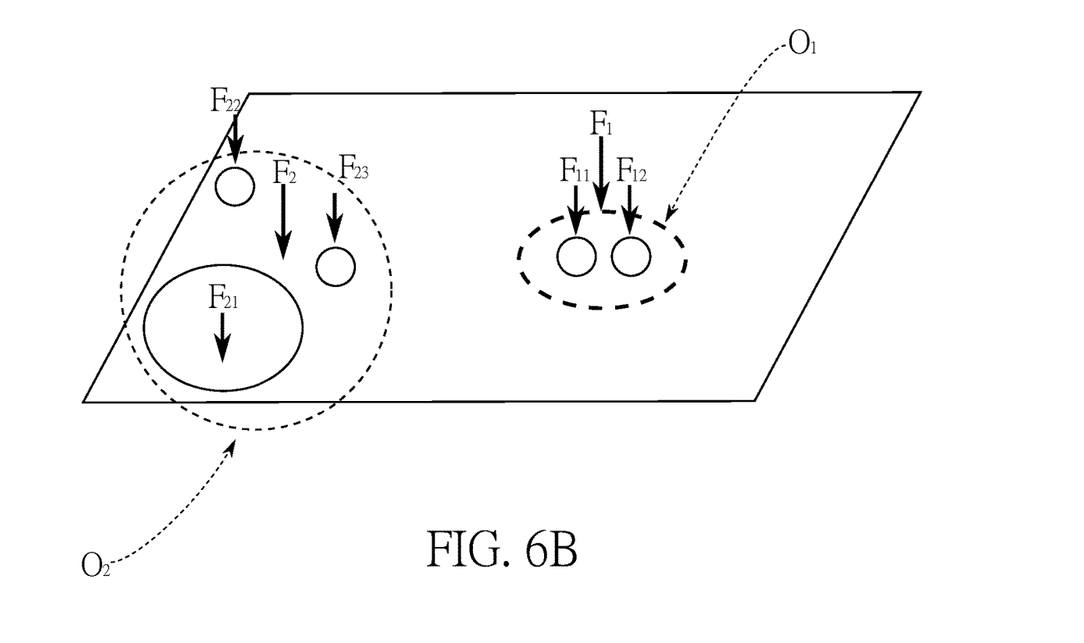
Figure 7A:
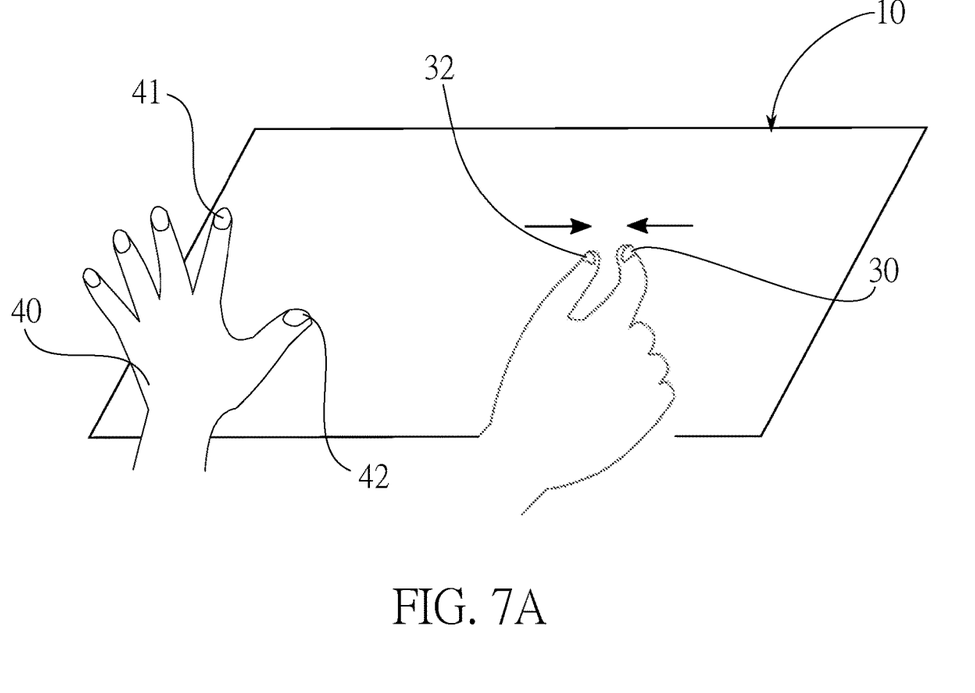
FIGS. 7A and 7B are fifth operational illustrative views of the method in FIG. 1.
Figure 7B:
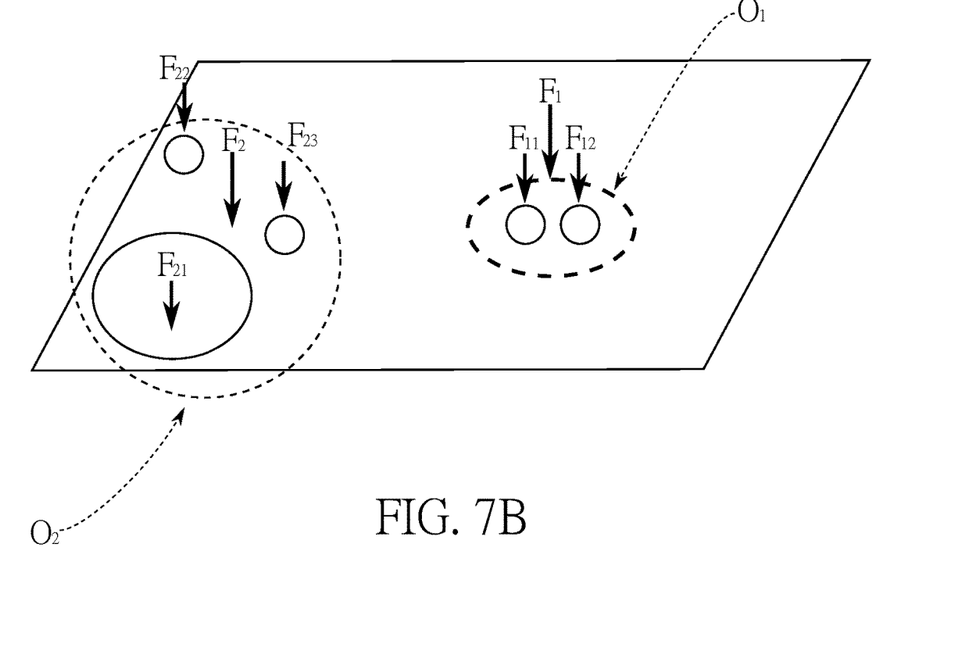

With reference to FIGS. 2, 5A and 5B, the user touches the touch device 10 with the right index finger 30 and the right middle finger 31 sliding on the touch device 10, while the left palm 40, the left index finger 41 and the left thumb 42 are inadvertently placed on the touch device 10. The touch sensors 11 obtain the touch information of the right index finger 30, the right middle finger 31, the left palm 40, the left index finger 41 and the left thumb 42 including the position information and the contact time information. The force sensors 12 obtain different force information in their relative position due to the presses of the right index finger 30, the right middle finger 31, the left palm 40, the left index finger 41 and the left thumb 42. According to the touch information of the right index finger 30 and the right middle finger 31, it can be observed that the moving distances of the right index finger 30 and the right middle finger 31 exceed a predetermined distance. Thus, the touches of the right index finger 30 and the right middle finger 31 are labeled as fingers and active objects. According to the touch information of the left palm 40, it can be observed that the left palm 40 does not move exceeding the predetermined distance. Thus, the touch of the left palm 40 is labeled as a palm and a non-active object. According to the touch information of the left index finger 41 and the left thumb 42, it can be observed that the left index finger 41 and the left thumb 42 does not move exceeding the predetermined distance. Thus, the touches of the left index finger 41 and the left thumb 42 are labeled as fingers and non-active objects. Then the touches of the right index finger 30 and the right middle finger 31 are clustered into the first object group $O_1$ according to the label of the touch of the right index finger 30 and the right middle finger 31, while the touches of the left palm 40, the left index finger 41 and the left thumb 42 are clustered into the second object group $O_2$ according to the label of the touch of the left palm 40, the left index finger 41 and the left thumb 42. The gravity center of the first object group $O_1$ is calculated by the positions of the touches of the right index finger 30 and the right middle finger 31 with calculating their average or weightingly calculating their average. The gravity center of the second object group $O_2$ is calculated by the positions of the touches of the left palm 40, the left index finger 41 and the left thumb 42 with calculating their average or weightingly calculating their average. Then the pressing force $F_1$ of the first object group $O_1$ and the pressing force $F_2$ of the second object group $O_2$ are calculated according to the force information of each force sensor 12, instead of calculating the pressing forces $F_{11}$, $F_{12}$, $F_{21}$, $F_{22}$, $F_{23}$ of the right index finger 30, the right middle finger 31, the left palm 40, the left index finger 41 and the left thumb 42. Based on the touch information of the right index finger 30 and the right middle finger 31 and the pressing force $F_1$ of the first object group $O_1$, the touch event is determined. The touch information of the left palm 40, the left index finger 41 and the left thumb 42 and the pressing force $F_2$ of the second object group $O_2$ do not trigger any touch event. For example, when the touch information shows that the right index finger 30 and the right middle finger 31 contact the touch device 10 and slide toward the same direction exceeding the predetermined distance, the touch event is determined as "scrolling". In addition, the pressing force $F_1$ may be used to adjust the scrolling speed. For example, when the pressing force $F_1$ does not reach a threshold, the scrolling speed is a preset speed. For example, when the pressing force $F_1$ exceeds a threshold, the scrolling speed may be n times the preset speed. The "n" may be set based on requirement. Otherwise, different thresholds may be set and the scrolling speed may accordingly be one time, n times, 2n times, etc. The "n" may be a natural number greater than one.

Embodiment IV

With reference to FIGS. 2, 6A, 6B, 7A and 7B, the user touches the touch device 10 with the right index finger 30 and the right thumb 32 sliding on the touch device 10, while the left palm 40, the left index finger 41 and the left thumb 42 are inadvertently placed on the touch device 10. The touch sensors 11 obtain the touch information of the right index finger 30, the right thumb 32, the left palm 40, the left index finger 41 and the left thumb 42 including the position information and the contact time information. The force sensors 12 obtain different force information in their relative position due to the presses of the right index finger 30, the right thumb 32, the left palm 40, the left index finger 41 and the left thumb 42. According to the touch information of the right index finger 30 and the right thumb 32, it can be observed that the moving distances of the right index finger 30 and the right thumb 32 exceed a predetermined distance. Thus, the touches of the right index finger 30 and the right thumb 32 are labeled as fingers and active objects. According to the touch information of the left palm 40, it can be observed that the left palm 40 does not move exceeding the predetermined distance. Thus, the touch of the left palm 40 is labeled as a palm and a non-active object. According to the touch information of the left index finger 41 and the left thumb 42, it can be observed that the left index finger 41 and the left thumb 42 does not move exceeding the predetermined distance. Thus, the touches of the left index finger 41 and the left thumb 42 are labeled as fingers and non-active objects. Then the touches of the right index finger 30 and the right thumb 32 are clustered into the first object group $O_1$ according to the label of the touch of the right index finger 30 and the right thumb 32, while the touches of the left palm 40, the left index finger 41 and the left thumb 42 are clustered into the second object group $O_2$ according to the label of the touch of the left palm 40, the left index finger 41 and the left thumb 42. The gravity center of the first object group $O_1$ is calculated by the positions of the touches of the right index finger 30 and the right thumb 32 with calculating their average or weightingly calculating their average. The gravity center of the second object group $O_2$ is calculated by the positions of the touches of the left palm 40, the left index finger 41 and the left thumb 42 with calculating their average or weightingly calculating their average. Then the pressing force $F_1$ of the first object group $O_1$ and the pressing force $F_2$ of the second object group $O_2$ are calculated according to the force information of each force sensor 12, instead of calculating the pressing forces $F_{11}$, $F_{12}$, $F_{21}$, $F_{22}$, $F_{23}$ of the right index finger 30, the right thumb 32, the left palm 40, the left index finger 41 and the left thumb 42. Based on the touch information of the right index finger 30 and the right thumb 32 and the pressing force $F_1$ of the first object group $O_1$, the touch event is determined. The touch information of the left palm 40, the left index finger 41 and the left thumb 42 and the pressing force $F_2$ of the second object group $O_2$ do not trigger any touch event. For example, when the touch information shows that the relative distance between the touches of the right index finger 30 and the right thumb 32 increases or decreases exceeding a predetermined distance and move toward opposite directions, the touch event is labeled as "zoom-in" or "zoom-out". In addition, the pressing force $F_1$ may be used to adjust the zooming speed. For example, when the pressing force $F_1$ does not reach a threshold, the zooming speed is a preset speed. For example, when the pressing force $F_1$ exceeds a threshold, the zooming speed may be n times the preset speed. The "n" may be set based on requirement. Otherwise, different thresholds may be set and the zooming speed may accordingly be one time, n times, 2n times, etc. The "n" may be a natural number greater than one.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for determining a force of touch objects on a touch device comprising a touch input surface and multiple force sensors, wherein the method comprises steps of:
   (a) obtaining a touch information of each of multiple touch objects on the touch input surface of the touch device and obtaining a force information of each force sensor corresponding to the touch objects;
   (b) assigning all of the touch objects to either an active object group or a non-active object group according to the touch information; and
   (c) calculating a pressing force of active object group based on the force information rather than calculating a pressing force of every one of the touch objects.

2. The method as claimed in claim 1, wherein the step b comprises
   labeling the touch objects according to the touch information; and
   assigning the touch objects to either the active object group or the non-active object group according to the label of the touch objects.

3. The method as claimed in claim 2 further comprising a step of calculating a gravity center of active object group according to the touch information of the touch objects of the active object group after assigning the touch objects to either the active object group or the non-active object group, wherein
   the gravity center of the active object group is used as a position to calculate the pressing force.

4. The method as claimed in claim 3, wherein the gravity center of the active object group is calculated based on position information of the touch information of the touch objects of the active object group.

5. The method as claimed in claim 3, wherein the gravity center of the active object group is calculated based on position information and area information of the touch information of the touch objects of the active object group, wherein the touch objects with larger area are given larger weights.

6. The method as claimed in claim 2, wherein each touch object is labeled as either an active object or a non-active object in the step of labeling the touch objects.

7. The method as claimed in claim 2, wherein the touch object is labeled as one of a finger, a palm and a pen in the step of labeling the touch objects.

8. The method as claimed in claim 6, wherein the touch object is further labeled as one of a finger, a palm and a pen in the step of labeling the touch objects.

9. A method for determining a touch event of a touch object including a force on a touch device comprising a touch input surface and multiple force sensors, wherein the method comprises steps of:
   (a) obtaining a touch information of each of multiple touch objects on the touch input surface of the touch device and obtaining a force information of each force sensor corresponding to the touch objects;
   (b) assigning all of the touch objects to either an active object group or a non-active object group according to the touch information;
   (c) calculating a pressing force of active object group based on the force information rather than calculating a pressing force of every one of the touch objects; and
   (d) determining a touch event according to the pressing force and the touch information of the active object group.

10. The method as claimed in claim 9, wherein the step b comprises
    labeling the touch objects according to the touch information before assigning the touch objects to either the active object group or the non-active object group; and
    assigning the touch objects to either a first the active object group or the non-active object group according to the label of the touch objects.

11. The method as claimed in claim 10, wherein
    in the step a, the touch information of a first touch object is obtained and the force information of each force sensor is obtained, wherein the step a further comprises steps of determining that an area of the first touch object is smaller than a predetermined area threshold and a stagnant time of the first touch object does not exceed a preset time according to the touch information of the first object;
    in the step b, the first touch object is labeled as a finger and an active object based on the touch information of the first object, and the first touch object is assigned to the active object group according to the label of the first touch object; and
    in the step d, a touch event is determined to be single-click when the pressing force exceeds a preset force threshold associated with the touch information of the first touch object.

12. The method as claimed in claim 10, wherein
in the step a, the touch information of a first touch object and a second touch object are obtained and the force information of each force sensor is obtained, wherein the step a further comprises steps of determining that the moving distances of the first touch object and the second touch object exceed a trigged distance threshold and areas of the first touch object and the second touch object are smaller than a preset area threshold;
in the step b, the first touch object and the second object are labeled as fingers and active objects based on the touch information of the first object and the second object, and the first touch object and the second touch object are assigned to the active object group according to the labels of the first touch object and the second touch object, and a gravity center of the active object group is calculated based on position information of the first touch object and the second touch object;
in the step c, a pressing force of the active object group referring to the gravity center of the active object group is calculated based on the force information; and
in the step d, a touch event is determined to be a scrolling event when the first touch object and the second touch object slide toward the same direction and the moving distances of the first touch object and the second touch object exceed the trigged distance threshold.

13. The method as claimed in claim 12, wherein when the touch event is determined to be the scrolling event, a scrolling speed is adjusted according to a strength of the pressing force of the active object group when the pressing force of the active object group exceeds a force threshold.

14. The method as claimed in claim 10, wherein
in the step a, the touch information of a first touch object and a second touch object are obtained and the force information of each force sensor is obtained, wherein the step a further comprises steps of determining that the moving distances of the first touch object and the second touch object exceed a trigged distance threshold and areas of the first touch object and the second touch object are smaller than a preset area threshold;
in the step b, the first touch object and the second object are labeled as fingers and active objects based on the touch information of the first object and the second object, and the first touch object and the second touch object are assigned to the active object group according to the labels of the first touch object and the second touch object, and a gravity center of the active object group is calculated based on position information of the first touch object and the second touch object;
in the step c, a pressing force of the active object group referring to the gravity center of the active object group is calculated based on the force information; and
in the step d, a touch event is determined to be zoom-out when the first touch object and the second touch object slide toward opposite directions and distance between the first touch object and the second touch object decreases exceeding a zoom-out distance threshold, and a touch event is determined to be zoom-in when the first touch object and the second touch object slide toward opposite directions and distance between the first touch object and the second touch object increases exceeding a zoom-in distance threshold.

15. The method as claimed in claim 14, wherein when the touch event is determined to be zoom-in or zoom-out, a zooming speed is adjusted according to a strength of the pressing force of the active object group when the pressing force of the active object group exceeds a force threshold.

\* \* \* \* \*